United States Patent
Lambert et al.

(10) Patent No.: US 9,977,662 B2
(45) Date of Patent: May 22, 2018

(54) DYNAMIC ADAPTER DESIGN PATTERN

(71) Applicant: CA, Inc., New York, NY (US)

(72) Inventors: Gregory J. Lambert, Austin, TX (US); Sheena Patel, Round Rock, TX (US)

(73) Assignee: CA, Inc., New York, NY (US)

(*) Notice: Subject to any disclaimer, the term of this patent is extended or adjusted under 35 U.S.C. 154(b) by 261 days.

(21) Appl. No.: 14/668,412

(22) Filed: Mar. 25, 2015

(65) Prior Publication Data

US 2016/0283206 A1   Sep. 29, 2016

(51) Int. Cl.
*G06F 9/44* (2018.01)
*G06F 9/45* (2006.01)

(52) U.S. Cl.
CPC . *G06F 8/40* (2013.01); *G06F 8/24* (2013.01)

(58) Field of Classification Search
None
See application file for complete search history.

(56) References Cited

U.S. PATENT DOCUMENTS

| | | | |
|---|---|---|---|
| 5,710,926 A | 1/1998 | Maurer | |
| 6,026,237 A | 2/2000 | Berry et al. | |
| 6,438,745 B1* | 8/2002 | Kanamaru | G06F 9/44521 717/137 |
| 7,281,236 B1* | 10/2007 | Galvin | G06F 8/38 717/104 |
| 7,765,529 B1* | 7/2010 | Singh | G06F 8/34 717/134 |
| 7,787,688 B1* | 8/2010 | Kass | G06T 15/00 348/241 |
| 8,046,735 B1* | 10/2011 | Singh | G06F 8/34 717/105 |
| 8,689,173 B2 | 4/2014 | Elaasar | |
| 9,063,748 B1* | 6/2015 | Bakale | |
| 9,411,562 B2* | 8/2016 | Venkata Naga Ravi | G06F 8/65 |
| 2007/0231781 A1* | 10/2007 | Zimmermann | G09B 5/00 434/350 |
| 2009/0204953 A1* | 8/2009 | Swingler | G06F 8/51 717/136 |
| 2009/0249360 A1* | 10/2009 | Wiseman | G06Q 10/06 719/315 |
| 2011/0078211 A1* | 3/2011 | Gass | G06F 8/65 707/803 |
| 2011/0283269 A1* | 11/2011 | Gass | G06F 8/65 717/168 |

(Continued)

*Primary Examiner* — Chat Do
*Assistant Examiner* — Douglas Slachta
(74) *Attorney, Agent, or Firm* — Baker Botts L.L.P.

(57) ABSTRACT

A method for a dynamic adapter design pattern is described. The method comprises receiving an object comprising object data, wherein the object is associated with an application context. A first type of the object is determined, and the object data is depicted in a first manner determined by the first type. A target type is determined based on the application context. A conversion mechanism is selected from a plurality of conversion mechanisms based on the first type and the target type. The conversion mechanism is applied to the object of the first type to create a new object of the target type. To apply the conversion mechanism, the object is converted from the first type to the target type, wherein the object data is depicted in a second manner determined by the target type, and a field of object data is modified based on the target type.

13 Claims, 3 Drawing Sheets

(56) References Cited

U.S. PATENT DOCUMENTS

| | | | |
|---|---|---|---|
| 2011/0296391 A1* | 12/2011 | Gass | G06F 8/72 |
| | | | 717/168 |
| 2012/0023307 A1 | 1/2012 | Morris | |
| 2013/0275449 A1* | 10/2013 | Amulu | G06F 17/30914 |
| | | | 707/756 |
| 2014/0033171 A1* | 1/2014 | Lorenz | G06F 8/34 |
| | | | 717/121 |
| 2014/0282465 A1* | 9/2014 | Matenaar | G06F 9/45504 |
| | | | 717/168 |
| 2014/0372973 A1* | 12/2014 | Urdang | G06F 9/4436 |
| | | | 717/108 |
| 2016/0124722 A1* | 5/2016 | Mathew | G06F 8/51 |
| | | | 717/136 |

\* cited by examiner

DYNAMIC ADAPTER DESIGN PATTERN

BACKGROUND

The present disclosure relates to adapters and, in particular, to an apparatus, computer-readable medium, and method for dynamically adapting interfaces.

SUMMARY

According to an embodiment of the present disclosure, a method comprising receiving an object, comprising object data, associated with an application context. The method further comprising determining a first type of the object, the object data depicted in a first manner determined by the first type. The method further comprising determining a target type based on the application context, and selecting a conversion mechanism from a plurality of conversion mechanism based on the first type and the target type. The method further comprising applying the conversion mechanism to the object of the first type to create a new object of the target type, wherein applying the conversion mechanism comprises converting the object from the first type to the target type, the object data depicted in a second manner determined by the target type, and modifying a field of the object data based on the target type.

According to another embodiment of the present disclosure, a computer configured to access a storage device, the computer comprising a processor, and a non-transitory, computer-readable storage medium storing computer-readable instructions that when executed by the processor cause the computer to perform the aforementioned method.

According to another embodiment of the present disclosure, a computer program product comprising a computer-readable storage medium having computer-readable program code embodied therewith, the computer-readable program comprising computer-readable program code configured to perform the aforementioned method.

Other objects, features, and advantages will be apparent to persons of ordinary skill in the art in view of the following detailed description and the accompanying drawings.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings. Embodiments of the present disclosure, and their features and advantages, may be understood by referring to FIGS. 1-4, like numerals being used for corresponding parts in the various drawings.

DETAILED DESCRIPTION

Figure 1:
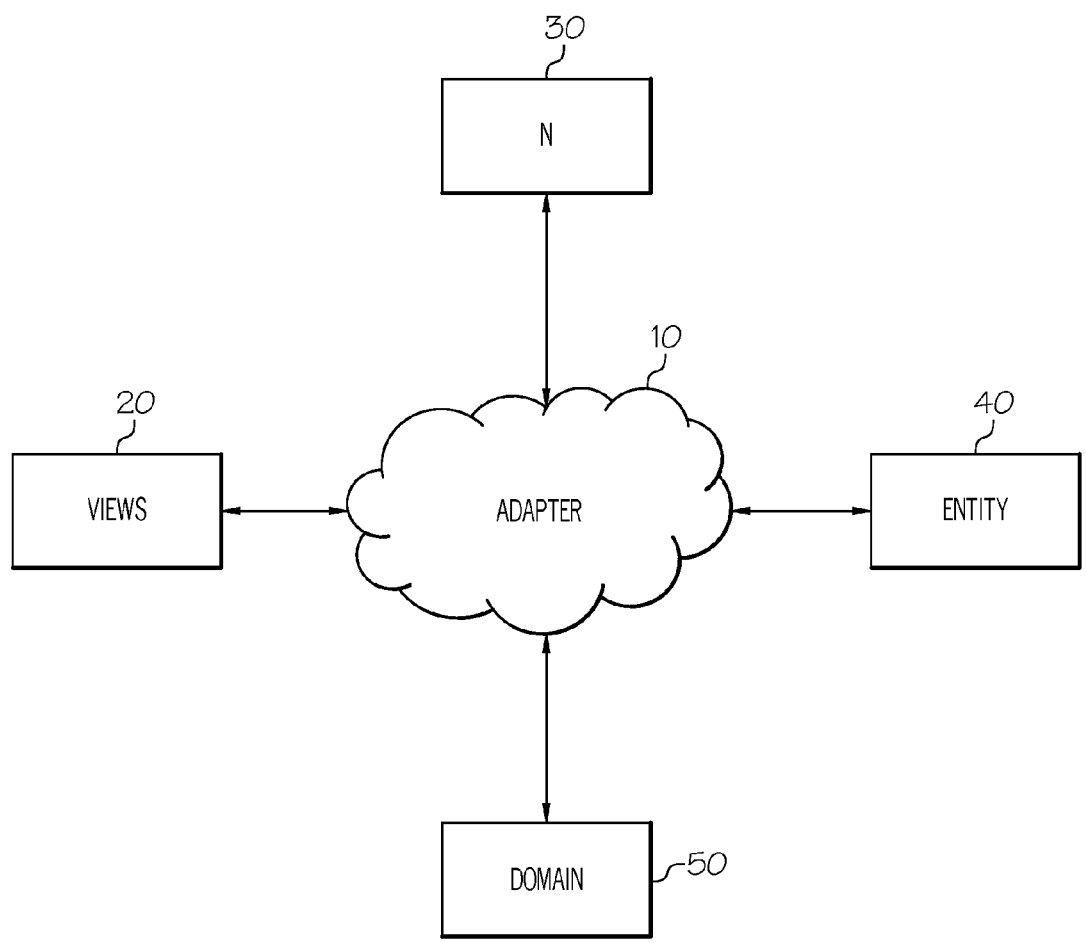
FIG. 1 is a schematic representation of the adaptation ecosystem in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While certain example systems and methods disclosed herein may be described with reference to contactless transactions using a mobile device, systems and methods disclosed herein may also be related to contactless transactions utilizing credit cards, ticket scanning, transportation passes, and building access.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Reusing old software is consistently elusive. Oftentimes old interfaces are not directly compatible with new interfaces due to difference in synchronization, standards, or alignment. For example, an old two-prong wall is incompatible with a new three-prong electrical plug. In order to make the old harmonious with the new, an adapter is necessary to convert the three-prong plug to a two-prong plug for interaction with the two-prong outlet.

Similarly, an adapter pattern is a software design pattern that allows two incompatible interfaces to work together. An adapter converts the interface of a class into another interface clients expect. An adapter may function as a wrapper or modifier of an existing class or object, providing a different or translated view of that class or object.

However, the present adapter patterns do not go beyond adapting one interface to work with another. The adapter of the present disclosure improves the adapter pattern structure through dynamic transformations that improve the compatibility of several interfaces. The present adapter class contains multiple conversion methods that receive, filter, and return a specified object type. Furthermore, the adapter of the present disclosure modifies a field of the object data based on an application context. This improvement adds an important aspect to the adaption process and improves functionality between interfaces.

Accordingly, there is a need in the marketplace for an adaptation process that improves interface usability for clients. From an efficiency, security, and cost standpoint, the current disclosure provides an effective solution by modifying data in a way that best suits the target interface during adaptation. Embodiments of the present disclosure can address the above problems, and other problems, individually and collectively.

FIG. 1 is a schematic representation of the adaptation ecosystem in accordance with a non-limiting embodiment of the present disclosure. The adaptation ecosystem may include an adapter 10 and several interfaces. In a non-limiting embodiment of the present disclosure shown in FIG. 1, there are four interfaces: views interface 20, entity interface 40, domain interface 50, and N-interface 30. N-interface 30 represents the unlimited additional interfaces that can be introduced into the adaptation ecosystem. The adapter 10 may be considered a blind adapter as it may be viable with many different interfaces.

Figure 2:
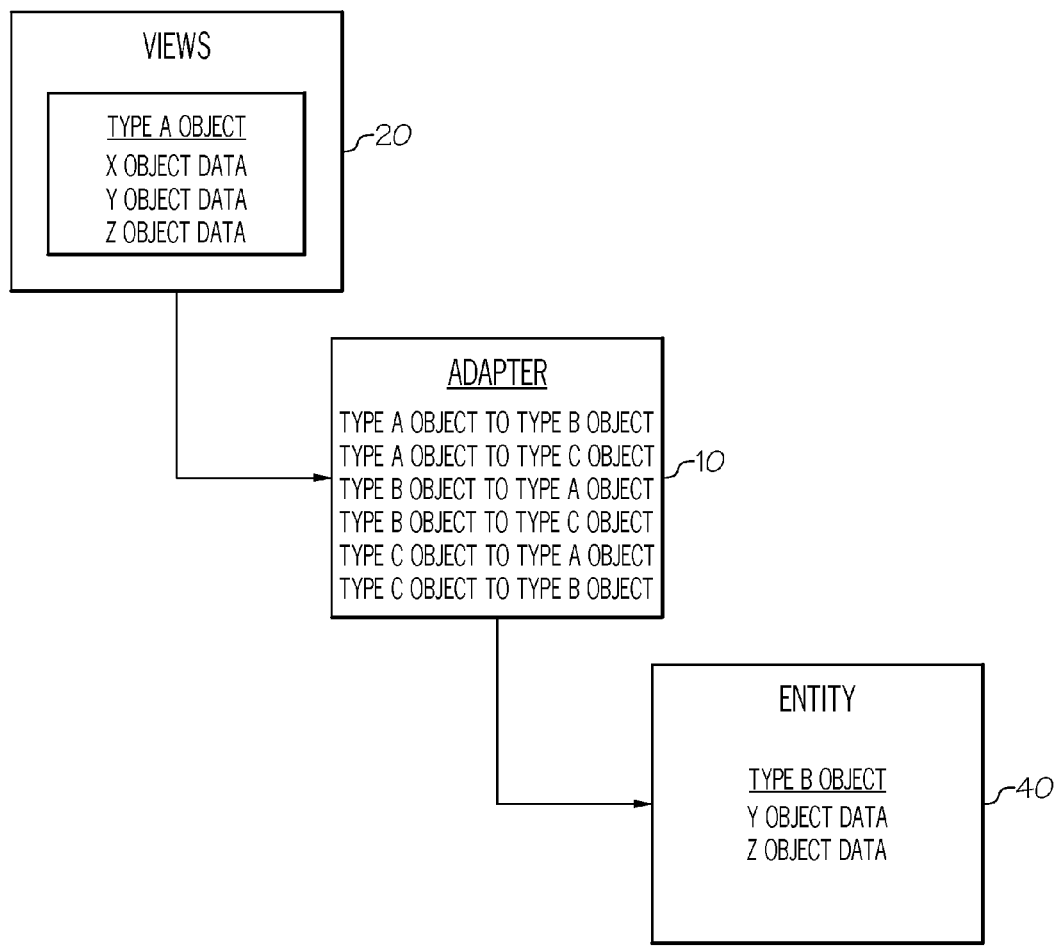
FIG. 2 is a schematic depiction of the adaptation between interfaces in accordance with a non-limiting embodiment of the present disclosure.

FIG. 2 is a schematic depiction of the adaptation between interfaces in accordance with a non-limiting embodiment of the present disclosure. In the example shown in FIG. 2, object data from the view interface is adapted to become object data compatible with the entity interface 40. The adapter 10 may contain several adaptation conversions from one type of object to another type of object. For example, the view interface 20 may display Type A objects better than Type B objects. However, the entity interface 40 may display Type B objects better than Type A objects. To suit the needs of both interfaces, the adapter 10 can convert the object from Type A to Type B for the view interface 20, and vice versa for the entity interface 40. Thus, the adapter 10 promotes interchangeability of objects between interfaces.

Furthermore, the adapter 10 of the present disclosure may additionally determine which object data of the object to transmit based on the preference of the interface. For example, as mentioned previously, the entity interface 40 may display Type B objects superior to Type A objects. Furthermore, each interface may depict data in a different manner. The entity interface 40 may depict object data in one manner and the view entity 20 may depict object data in a different manner. Moreover, those interacting with the entity interface 40 may only be interested in certain object data, so the adapter 10 may ignore portions of the object data during adaptation from Type A to Type B. This process permits dynamic transformation of objects throughout the adaptation ecosystem.

FIG. 2 provides an example of a dynamic transformation in the adaptation ecosystem. For example, those interacting with the view interface 20, which best displays Type A objects, may only be interested in X, Y, and Z object data. Additionally, those interacting with the entity interface 40, which best displays Type B objects, may only be interested in Y and Z object data. In other words, certain data may not be relevant to certain interfaces. During adaptation from a Type A object in the view interface 20 to a Type B object in the entity interface 40, the adapter 10 will select the appropriate conversion mechanism from a plurality of conversion mechanisms. In the present example, the adapter 10 will select the Type A to Type B conversion mechanism as shown in FIG. 2.

Furthermore, the adapter 10 will only transmit the Y and Z object data to the entity interface 40. The adapter 10 is aware which interface prefers which object data and will adjust accordingly. A configuration file may be used to modify a field of object data based on the target object type. Furthermore, the adapter 10 may modify a field of the object data by excluding, based on the target object type, a portion of the field of object data. The adapter 10 may use an ignore list during this process. The ignore list may be leveraged by configuration, which may be accomplished through enumeration. The adapter 10 may provide the ability to pick and choose which object fields to return with the object using the ignore list. The ignore list may use a list of variables to exclude data in the object returned. In other non-limiting embodiments, the adapter 10 may modify a field of the object data by including additional data or creating data. The adapter 10 may modify object data based on the application context, the target type, the target interface, or a combination thereof.

The example depicted in FIG. 2 is a non-limiting embodiment of the present disclosure. The adapter 10 may be reused in other situations, such as converting the object and object data of the view interface 20 to the preferred object type and data of the domain interface. In such a situation, the adapter 10 may select an appropriate conversion mechanism from the plurality of conversion mechanisms based on object type and preferred object data. Additionally, the adapter 10 is compatible with any type of interface, object type, and object data.

Figure 3:
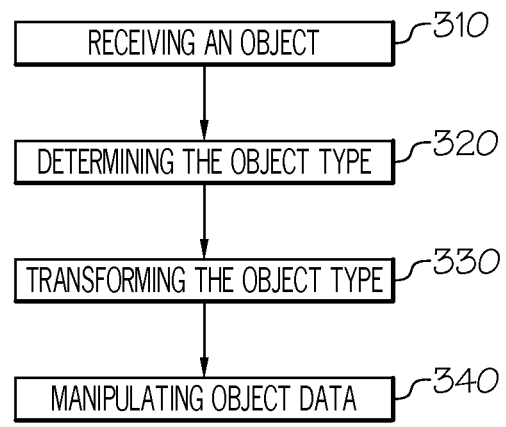
FIG. 3 illustrates a flow chart depicting the adaptation process between interfaces in accordance with a non-limiting embodiment of the present disclosure.

FIG. 3 illustrates a flow chart depicting the adaptation process between interfaces in accordance with a non-limiting embodiment of the present disclosure. In step 310, the adapter 10 receives an object of a specific object type from an interface during a dynamic transformation process. The adapter 10 is aware of the application context and the target interface. As such, the adapter 10 will determine in step 320 the object type from the sending interface as well as the target object type for the target interface. In step 330, the adapter 10 will select a conversion mechanism to transform the object type from the received object type to the target object type, according to the application context. In step 340, the adapter 10 may manipulate object data according to the preferences of the target interface.

Figure 4:
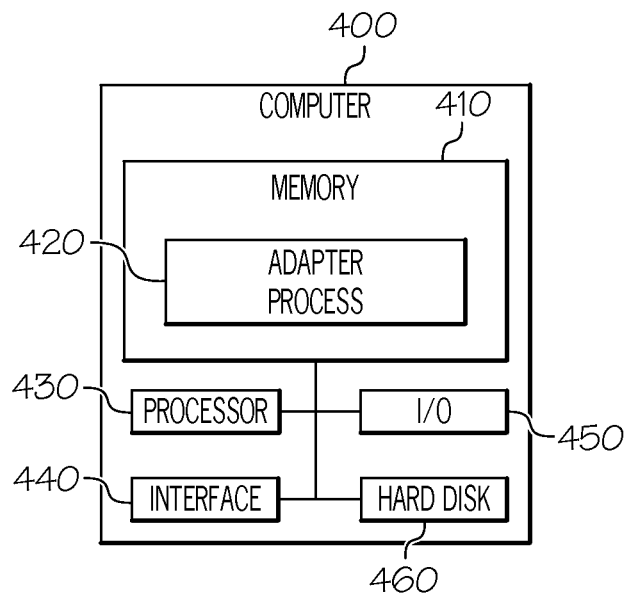
FIG. 4 illustrates a computer mechanism containing the adapter process in a non-limiting embodiment of the present disclosure.

FIG. 4 illustrates a computer mechanism containing the adapter process in a non-limiting embodiment of the present disclosure. The adaptation process may take place on a computer 400 as shown in FIG. 4. The computer 400 may include a memory 410 with an adapter process 420. The computer 400 may also include a processor 430, an interface 440, input and output ("I/O") device 450, and a hard disk 460. Processor 430 may be operable to load instructions from hard disk 460 into memory 410 and execute those instructions. Memory 410 may store computer-readable instructions that may instruct the computer 400 to perform certain processes. I/O device 450 may receive one or more of data from a server or network.

The server or network may comprise one or more entities, which may be public, private, or community based. Each network may permit the exchange of information and services among users/entities that are connected to such network. In certain configurations, the network may be a local area network, such as an intranet. Further, the network may be a closed, private network/cloud in certain configurations, and an open network/cloud in other configurations. The network may facilitate wired or wireless communications of information and provisioning of services among users that are connected to network.

The figures illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

While the present disclosure has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. It will also be understood by those of ordinary skill in the art that the scope of the disclosure is not limited to use in transactions with a merchant terminal, but rather that embodiments of the invention may be used in any transaction having a need to receive confirmation notification of any type. The specification and the described examples are considered as exemplary only, with the true scope and spirit of the invention indicated by the following claims.

What is claimed is:

1. A method, comprising:
  receiving, at an adapter, a source object from a first interface of a network, the network including the adapter and at least first, second and third interfaces;
  wherein the source object comprises source object data;

determining a source object type of the source object, wherein the source object data is depicted in a first format, wherein the first format is determined by the source object type;

determining a first target object type associated with the second interface;

determining a second target object type associated with the third interface;

selecting a first conversion mechanism from a plurality of conversion mechanisms based on the source object type and the first target object type;

selecting a second conversion mechanism from the plurality of conversion mechanisms based on the source object type and the second target object type;

applying the first conversion mechanism to the source object to obtain a first target object, wherein applying the first conversion mechanism comprises:

converting the source object from the source object type to the first target object type such that first target object data of the first target object is depicted in a second format that is different from the first format, wherein the second format is determined by the first target object type; and modifying a first field of the first target object data based on a difference between the source object type and the first target object type;

applying the second conversion mechanism to the source object to obtain a second target object of a second target object type; and wherein the second target object type is different than the first target object type;

wherein modifying the first field of the first target object data further comprises excluding, based on the first target object type, a portion of the first field of the first target object data; and wherein excluding, based on the first target object type, a portion of the first field of the target object data comprises using an ignore list.

2. The method of claim 1, wherein modifying the first field of the first target object data based on the first target object type further comprises using a configuration file.

3. The method of claim 1, wherein the ignore list comprises a list of object types and is used to exclude source object data from the target object data.

4. The method of claim 1, wherein applying the first conversion mechanism comprises:

determining a third target object type associated with a fourth interface included in the network;

selecting the second conversion mechanism from the plurality of conversion mechanisms based on the source object type and the third target object type;

converting, via the second conversion mechanism, the source object from the source object type to the third target object type; and modifying a second field of third target object data based on a difference between the source object type and the third target object type.

5. The method of claim 1, wherein the plurality of conversion mechanisms are part of an adapter design pattern.

6. A computer configured to access a storage device, the computer comprising:

a processor; and a non-transitory, computer-readable storage medium storing computer-readable instructions that when executed by the processor cause the computer to perform:

receiving a source object associated with an application context, wherein the application context comprises a source and a target;

wherein the source object comprises source object data;

determining a source object type of the source object, wherein the source object data is depicted in a first format, wherein the first format is determined by the source object type;

determining a target object type based on the target of the application context;

selecting a conversion mechanism from a plurality of conversion mechanisms based on the source object type and the target object type;

applying the conversion mechanism to the source object to obtain a target object, wherein applying the conversion mechanism comprises:

converting the source object from the source object type to the target object type such that target object data of the target object is depicted in a second format that is different from the first format, wherein the second format is determined by the target object type; and modifying a first field of the target object data based on a difference between the source object type and the target object type, wherein modifying a field of the target object data further comprises creating data;

wherein modifying the first field of the target object data further comprises excluding, based on the target object type, a portion of the first field of the target object data, and wherein excluding, based on the target object type, a portion of the first field of the target object data comprises using an ignore list.

7. The computer of claim 6, wherein modifying the first field of the target object data based on the target object type further comprises using a configuration file.

8. The computer of claim 6, further comprising:

determining a second target object type in a second application context;

selecting a second conversion mechanism from the plurality of conversion mechanisms based on the source object type and the second target object type;

converting, via the second conversion mechanism, the source object from the source object type to the second target type; and modifying a second field of the target object data based on a difference between the source object type and the second target object type.

9. The method of claim 6, wherein the plurality of conversion mechanisms are part of an adapter design pattern.

10. A computer program product comprising:

a computer-readable storage medium having computer-readable program code embodied therewith, the computer-readable program code comprising:

computer-readable program code configured to receive a source object associated with an application context, wherein the application context comprises a source and a target;

wherein the source object comprises source object data;

computer-readable program code configured to determine a source object type of the source object, wherein the object data is depicted in a first format, wherein the first format is determined by the source object type;

computer-readable program code configured to determine a target object type based on the target of the application context;

computer-readable program code configured to select a conversion mechanism from a plurality of conversion mechanisms based on the source object type and the target object type;

computer-readable program code configured to apply the conversion mechanism to the source object to obtain a target object, wherein applying the conversion mechanism comprises:

computer-readable program code configured to convert the source object from the source object type to the target object type such that target object data of the target object is depicted in a second format that is different from the first format, wherein the second format is determined by the target object type; and computer-readable program code configured to modify a first field of the target object data based on a difference between the source object type and the target object type, wherein modifying a field of the target object data further comprises creating data; and wherein computer-readable program code configured to modify the first field of the target object data further comprises:

computer-readable program code configured to exclude, based on the target object type, a portion of the first field of the target object data; and wherein computer-readable program code configured to exclude, based on the target object type, a portion of the first field of the target object data further comprises computer-readable program code configured to use an ignore list.

11. The computer program product of claim 10, wherein computer-readable program code configured to modify the first field of the target object data further comprises computer-readable program code configured to use a configuration file.

12. The computer program product of claim 10, further comprising:

computer-readable program code configured to determine a second target object type in a second application context;

computer-readable program code configured to select a second conversion mechanism from the plurality of conversion mechanisms based on the source object type and the second target object type;

computer-readable program code configured to convert, via the second conversion mechanism, the source object from the source object type to the second target type; and computer-readable program code configured to modify a second field of the target object data based on a difference between the source object type and the second target object type.

13. The computer program product of claim 10, wherein the plurality of conversion mechanisms are part of an adapter design pattern.

* * * * *